Figure 1:

Dec. 19, 1950  C. S. WEBBER ET AL  2,534,806
COATED ABRASIVE ARTICLES
Filed July 18, 1947

INVENTORS
Charles S. Webber
William F. Timmer
BY Nicholas E. Oglesby
AGENT

Patented Dec. 19, 1950

2,534,806

UNITED STATES PATENT OFFICE 2,534,806

COATED ABRASIVE ARTICLES

Charles S. Webber, Loudonville, and William F. Timmer, Cohoes, N. Y., assignors to Behr-Manning Corp., Troy, N. Y., a corporation of Massachusetts Application July 18, 1947, Serial No. 761,750

8 Claims. (Cl. 51—298)

This invention relates to coated abrasives such as sandpaper, emery cloth and similar articles, which usually comprise a reinforcing layer or support or backing such as paper, cloth, vulcanized fibre or laminations of the same, on one or both sides of which there is adhesively attached, an abrasive surface of grits. The grits or abrasive particles comprise some suitable material such as emery, artificially fused aluminum oxide of abrasive grade, flint, garnet, corundum, silicon carbide, etc., or mixtures thereof.

It is an object of the present invention to provide efficient, but cheaper, binders for coated abrasives than have heretofore been available.

It is a further object of this invention to provide coated abrasives made with such binders.

It is a further object of this invention to modify certain readily available and usually comparatively cheap vegetable adhesives or glues to provide efficient, cheap, and readily usable binders.

It is a further object of this invention to provide practical processes for making high grade coated abrasives with a binder having a large part of its adhesive elements derived from starch, such as potato starch, tapioca starch, corn starch and equivalent starches.

For many years coated abrasives were made almost entirely with an adhesive consisting of hide glue to unite the abrasive grits to the reinforcing backing. Later there was considerable use of varnishes to provide a very flexible coated abrasive for specific purposes and essentially light hand sanding of varnishes or lacquer using water as a lubricant. However, these highly flexible coated abrasives were not generally suitable for production grinding operations, such as metal grinding, in the manufacture of metal articles and the abrading of wood in the furniture and allied industries, or in general where mechanical means, such as belt sanders, drum sanders, disc sanders, and the like, are commonly used.

In later years there has been considerable use of the strong, heat-hardened resins, such as the phenol-formaldehyde resins, in making coated abrasives for heavy duty sanding operations. However, coated abrasives made with such resins as binders are normally expensive as compared with those made with a hide glue binder, and special equipment capable of operating at high temperatures is required to cure such resins. For example, temperatures up to 300° F. are quite common in the manufacture of coated abrasives with such binders.

More recently there has been extensive use of the modified adhesives disclosed in U. S. Patent No. 2,322,156, issued June 15, 1943, to Nicholas E. Oglesby, for holding the abrasive grains to the backing. Such modified adhesives have the advantages for such uses as are pointed out in the said patent to Nicholas E. Oglesby.

The use of fillers such as those described in U. S. Patent No. 2,322,156 has made it possible to incorporate with the hide glue adhesive of the prior art, a large amount of a vegetable adhesive, such as dextrin or British gum and thereby to provide a satisfactory binder for coated abrasives containing a substantial proportion of such dextrins or gums.

In recent years hide glue has become comparatively scarce as compared with the many uses for this material and as a result of this limited supply and for other reasons the price of hide glue has risen to a point where it is more expensive than many resins.

In the past there have been attempts to make efficient coated abrasives with urea-formaldehyde resins but there has been little, if any, commercial success of such resins in the manufacture of coated abrasives, so far as we are aware, prior to our present invention.

In general, many urea-formaldehyde resins in the past have not been sufficiently heat-resistant for many operations. Furthermore, they have had poor keeping qualities and crazed in storage, with the result that the abrasive grits were ineffectively held to the backing.

Normally, urea-formaldehyde resins are cured at relatively low temperatures with the aid of an acid type catalyst such as a salt giving an acid reaction, for example, ammonium chloride or one of the acid phosphates. As used in the past, such acid catalysts, in conjunction with urea-formaldehyde resin binders, have weakened certain types of paper, especially at the junction between the paper and the binder.

The present invention provides a method of taking advantage of the low curing temperatures of urea-formaldehyde resins brought about by the use of acid type catalysts, without injury to such papers as have been injured thereby in the practice of the prior art.

It is a further advantage of the present invention that relatively cheap coated abrasives are provided which are, however, much more moisture-resistant, as well as more heat-resistant, than the coated abrasives of the prior art made with an animal glue binder to unite the grits to the reinforcing backing.

Certain variations of our new binders comprise synthetic resin adapted to strengthen the starch-derived adhesive and filler base which may be suitable water soluble amino-aldehyde resin such as the urea-formaldehyde or the aminotriazine-aldehyde types of resins. Such urea-formaldehyde resins and aminotriazine-aldehyde resins as are suitable for our purpose, are water-soluble at the time that our adhesive composition is formulated preparatory to making the coated abrasive. Likewise, our new binders comprise a large proportion of a starch type adhesive or of an adhesive derived from starch such as the dextrins, British gums, and other starch derivatives which are sufficiently soluble in water and not degraded to a point that their inherent adhesive strength is too seriously damaged.

Our new adhesive compositions also contain a high percentage by volume, based upon the solids thereof, of an inert filler such as the fillers described in U. S. Patent No. 2,322,156.

In general, in the finally dried or cured form in the coated abrasive, our adhesive composition has of the order of 25 percent to 55 percent by volume of inert filler incorporated therein.

We are aware that it has been proposed to modify starch type adhesives with urea-formaldehyde and aminotriazine-aldehyde type resins, as, for example, for use in the manufacture of plywood. We do not claim any such adhesive composition, which we find entirely unsuited to our purpose, in the absence of the amount and type of filler herein set forth as required.

The various forms of our invention will be more clearly understood by reference to the drawings.

The single figure is a cross-section of an example of coated abrasives made in accordance with our invention.

Referring to the figure, 6 is a suitable backing for coated abrasives, such as a layer of paper, a layer of cloth, a layer of vulcanized fibre or a layer consisting of laminations of such materials as have heretofore been used in the coated abrasive art or improved forms of such laminations as, for example, those disclosed in application Serial No. 733,614, filed March 10, 1947 by Donald A. Waterfield. In the figure, 7 is a making coat of adhesive as, for example, any one of the making coats herein disclosed, the purpose of which is to anchor abrasive grains to the backing, 8 is a layer of abrasive grains anchored to the backing by the making coat 7, and 9 is a layer of sizing adhesive applied over the grains and may be any one of the sizing coats or variations of the same as herein disclosed.

Urea-formaldehyde resins suitable for use in our invention may be prepared as follows:

*Preparation of urea-formaldehyde resin*

1 mol of urea is added to a neutralized 37% formalin solution of pH 4.5 to 7.0, containing 1½ to 2 mols of formaldehyde. The solution is then gently refluxed about two hours to carry the condensation to a suitable stage, i. e. to a viscosity of about 50 to 450 cps. The solution is then neutralized. In order to obtain a stable solution that will store satisfactorily, the free formaldehyde should be combined by fixing with a formaldehyde fixing agent, for example, urea, melamine, or thiourea, etc., as is known in the art. The resin solution may then be concentrated under vacuum to from 50% to about 70% solids or the solution may be spray dried to yield a solid powder which is water-soluble. If desired, the stabilizing agent (i. e. formaldehyde fixing agent) may be omitted and ethyl alcohol may be added to the boiled-down syrup in an amount to produce a 10 percent to 20 percent concentration of the alcohol.

The preparation of a water solution of urea-formaldehyde resin of high concentration in the form of syrup and of water-soluble urea-formaldehyde powders is well known in the art and has been described in a number of publications and patents. Particularly pertinent information may be found, among other places, in U. S. Patents Nos. 2,242,484; 2,348,244 and 2,380,239.

In lieu of suitable urea-formaldehyde resins as just described, we may also use suitable aminotriazine-aldehyde resins, as, for example, a melamine-formaldehyde resin, which may be either in the form of a water solution of high concentration or of a water-soluble powder. Methods of preparing such melamine resins are thoroughly described in U. S. Patent No. 2,197,357.

Starches which have been converted to dextrins or British gums are suitable for use in our coating compositions.

These gums and dextrins are oxidized or heat treated starches, usually heated dry, with or without acid catalysts to convert them to a condition in which they are partially cold water dispersible.

These dextrins and gums may be dispersed at temperatures of 160–190° F. to yield dispersions of relatively high solids content, i. e. 25 percent to 50 percent by weight, which are fluid but of high viscosity.

On the other hand, the so-called thin boiling starches, which may be prepared by enzyme or hydrolytic action in water, are not generally suited for use alone as the starch-derived constituent of our adhesive compostion, since the viscosities of even 12½ percent solutions at 100° F., after heating to 180 to 190° F. to disperse, are generally too great to permit uniform coatings of sufficient solids content and adhesiveness to satisfactorily pick up and hold the abrasive grain when modified with urea formaldehyde and filler as disclosed herein.

The viscosity, at 35 percent solids and 100° F., after heating to 140 to 180° F. to disperse, of the gum dextrins preferred for this invention, ranges from 1000 cps. to 35,000 cps. and at 140° F., from 600 to 20,000 cps. and measured at 12½ percent solids by the procedure of the National Association of Glue Manufacturers for glue, ranges from 25 to 138 seconds. In this procedure 15 g. of the gum is dissolved in 105 g. of distilled water and the solution is heated to 142° F. to disperse, and then quickly transferred to the standard viscosity pipette held in a constant temperature bath, cooled to 140° F. and tested. The seconds required for outflow between the two reference marks (100 cc.) is recorded. These values may be converted to millipoises for absolute viscosity if desired.

The "solubility" of preferred gums or dextrins derived from starch, as determined by dispersing 25 g. of gum or dextrin in 500 cc. distilled water at 70° F. and then permitting to settle overnight and pipetting off 50 cc. of the clear supernatant solution, evaporating the same to dryness in an evaporation dish as a steam bath and finally drying to constant weight at 218° F., which weight divided by 2.5 and multiplied by 100 is the "solubility," ranges from 25 percent to 95 percent.

Thin boiling starches when made up to 35 percent solids in water and heated to 180–190° F. and cooled to 140° F. have a viscosity in excess of 500,000 cps. as measured by the Brookfield Synchromatic Viscosimeter or by other means, and, by the method of the National Association of Glue Manufacturers, give a very low viscosity, since the starch is not dispersed at 142° F. The "solubility" at 70° F. as determined on the thin boiling starches is under 10 percent by the herein described method given for dextrins and gums.

However, thin boiling starches may be used to modify the gums or dextrins provided the temperature is raised sufficiently high to convert such starches to the hydrophyllic state, i. e. usually to 180 to 195° F. Such temperatures, i. e., 180 to 195° F. decrease the viscosity of the gum. For this reason we prefer to add such starches to the water and cook to a temperature sufficiently high (often 180 to 195° F. will suffice) to convert such starches to the hydrophyllic state, then drop the temperature to about 140 to 160° F. and add the gum or dextrin in the form of a highly concentrated solution prepared as above described.

In general, we may use various mixtures of gums, dextrins, and thin boiling starches, provided the viscosity of a solution for such a mixture at 35 percent solids and 100° F. lies within the range of 1,000 to 35,000 centipoises and at 140° F. from 600 to 20,000 centipoises.

These starches, modified starches, and adhesives, such as gums and the like, derived from starches, having the properties herein described as suitable for our use, we term amylaceous adhesives.

We find the fillers used to modify the abrasive grit-holding binders of U. S. Patent No. 2,322,156 to be well adapted to our purposes. Such fillers have been well described in this patent.

In general these fillers are relatively hard and dense as compared with the organic binders and such fillers as wood flour, are non-porous and non-absorbent of either the adhesive or the solvent used in the adhesive and are inert or relatively non-reactive with respect to the adhesives themselves and the catalysts or curing agents, if any, that are used therewith, at the coating and curing or drying temperatures employed.

By stating that our filler is hard we mean that it is relatively hard as compared with the binder, especially at elevated temperatures encountered in the use of the various abrasive articles, such as belts and discs or drum covers and the like with which this invention is concerned, i. e. our filler is not materially softened at such elevated temperatures. By the term "non-fibrous" we mean to distinguish the fillers used from fibrous materials such as asbestos or cotton. By the term "non-absorbent" is meant that the filler does not appreciably absorb either the adhesive or the solvent, as has been found to be objectionable in the case of wood flour. By the terms "inelastic" and "non-deformable" is meant that the filler exhibits the above-specified characteristics under normal temperatures such as 70° F. By the term "dense" is meant that the filler, as compared with wood flour, is relatively free of pores and has a high degree of density.

The fillers used in this invention are not pulverized, that is, they are not of a size associated with dust, since such small particles, when dispersed in our adhesives in the quantities required to accomplish our purpose, do not produce a readily coatable adhesive or an adhesive that flows properly during the coating operations.

Particle shapes which trend towards the cubical or spherical as distinguished from such shapes as elongated spikes and thin wafers are preferred. Such stronger shaped fillers pack more densely in the adhesive and can be used in a higher percentage by weight or volume to impart greater hardness, greater resistance to heat, and more resistance to moisture, to the binders.

To accomplish our purposes a relatively high percentage of filler is used in the binder. Preferred compositions of adhesive in the dried state contain from about 25 percent to about 55 percent by volume of the inert fillers. Such adhesives are useful as both making or primary bonding coats used to attach the grains to the reinforcing backing and as sizing coats which are applied over the abrasive grains anchored in the making coat of adhesive.

Comminuted materials generally sold in the trade which have the required properties of relative hardness, non-porosity and chemical inertness to the binders used under the conditions of use, may have to be regraded to obtain desirable particle sizes and desirable distributions of particle sizes before use for the purposes of this invention.

The average surface diameter is a valuable guide in the selection of suitable fillers or modifying agents for the preparation of our adhesives.

Preferably the average surface diameter is not greater than about 28 microns nor less than about 7 or 8 microns, although acceptable results may in certain instances be obtained within an average surface diameter range of from about 5.5 to about 6.5 microns to 40 microns.

With respect to the limits of coarse material, it is usually preferred that the modifying agents or fillers used in this invention pass a 270 mesh screen having a mesh opening of 53 microns, or in most instances that the material pass through a screen with 325 meshes to the linear inch, that is, a screen having a mesh opening of 44 microns. However, acceptable results may sometimes be obtained if not more than 35 percent by volume or by weight of the modifying agent or filler remains on the said 270 mesh screen, while not less than 65 percent by volume or weight, passes the screen. Furthermore, it is preferable that the finer not less than 65 percent passing the screen have an average surface diameter in the range of about 5.5 to 40 microns.

In general we also prefer to use modifying agents or fillers which do not contain more than 12 percent by volume or by weight of particles having a diameter below two microns.

Where the terms "diameter," "average surface diameter" or "percent by weight or by volume" are used herein, it is contemplated that the numerical values for such terms will be determined as set forth in U. S. Patent No. 2,322,156.

Many materials are suitable as a base for our fillers or modifying agents, provided the fillers have the particle sizes and other properties set forth herein. Suitable materials from which our fillers may be prepared include calcium phosphate, fused aluminum oxide, garnet, quartz, slate, barium sulphate, aluminum silicate, and, in some cases, a few special clays, provided the particle sizes and distribution of particle sizes are as provided herein and provided the final form of the filler has the other properties set forth as required.

Flint paper is, as is well known, made with an abrasive grain consisting of quartz, which is a naturally occurring form of free silica. In making such flint paper, which is normally used in light abrading operations such as are carried out by hand, rather than with a tool for mechanical sanding, we frequently use a filler consisting of quartz and for this product consider that such use of a quartz filler will not increase any slight hazard, if any exists, in the use of ordinary flint paper, especially since the filler particles are well bonded by the adhesive and the bond is less friable than the quartz used as an abrasive grain coating.

While in general it is not believed that there is any great hazard in using a filler of quartz in our binder, we prefer to avoid any slight possibility of a hazard that might exist in the use of coated abrasives, especially by mechanical means, by using a filler that does not contain any substantial proportion of free silica in making coated abrasives, the abrasive constituent of which does not contain any substantial amount of free silica.

*Coated abrasive Example I*

Both the making coat and sizing coat of adhesive consists of the following composition, all calculated on a solids basis, i. e. to exclude any volatile solvent that is lost in the drying and curing process:

|  | Per cent by Weight | Per cent by Volume |
| --- | --- | --- |
| Gum (Derived from starch) | 34.7 | 46.0 |
| Urea-Formaldehyde Resin | 6.9 | 9.4 |
| Flint Filler | 56.6 | 42.4 |
| Ammonium Chloride Catalyst | 1.8 | 2.3 |

In making up the adhesives, sufficient water is used with the ingredients, as above listed, to give a viscosity at 90° F. of about 925 centipoises in the case of the making coat and of about 130 centipoises in the case of the sizing coat.

As used, the pH of these adhesives should preferably be within the range of about 4.5 to 6.8.

It is usually convenient to mix the gum or other starch derivative with cold water and heat up to a temperature of about 160 to 180° F. and hold at this temperature until a uniform dispersion is obtained. Subsequently this solution is cooled to about 90° F. or room temperature and while the solution is at this temperature, the urea-formaldehyde resin, dissolved in a small amount of water or in a dry form, is added.

Subsequently the flint filler is stirred in to uniformly disperse it in a mixture prepared as just described. Immediately before introducing the adhesive into the coating boxes of a sandpaper making and sizing machine, ammonium chloride, dissolved in a small amount of water, is added. A number of starch derivatives are satisfactory for the gum constituent, provided they meet the requirements hereinbefore outlined. We have used successfully, Penick & Ford's "Douglas Gum 5408" adhesive as currently sold. A suitable urea-formaldehyde resin may be made as heretofore described or certain commercial urea-formaldehyde resins on the market may be used, as, for example, "Urac 180" resin sold currently by American Cyanamid Corporation. The flint filler should conform to specifications hereinbefore outlined for the filler as to particle size and other properties. The grade of ammonium chloride, known as "technical ammonium chloride" is satisfactory.

The making and sizing adhesives prepared as just described are placed in the making and sizing boxes respectively of a commercial sandpaper making machine and held at a temperature of about 90° F. A backing of 60 lb. kraft paper such as is ordinarily used in making flint paper is fed through the making machine and a making coat of adhesive is applied in the conventional way. The web then travels past a sand or abrasive applying means from which is dispersed and applied to the adhesively coated backing in the usual way, a conventional coating of No. 1/2 flint grain. The web is then festooned for a short while to allow a preliminary set of the making coat of adhesive after which it is passed through a commercial sandpaper sizing machine and a sizing coat of the adhesive is applied over the grains in the usual way. The web so coated and sized is then festooned in a regular sandpaper drying room and heated for not less than three hours at a temperature of about 100 to about 120° F., preferably about 110° F.

The web of coated abrasive is then removed from the drying racks in the usual way and cut up into the usual size sheets or other forms for sale as is common in the manufacture and sale of flint paper.

The coated abrasive made as just described is a very satisfactory flint paper and it will be seen that we have provided a coated abrasive in which the gum or other starch derivative is 83⅓ percent by weight of the combined adhesive constituents, that is, the combined gum and resin.

This adhesive is, therefore, essentially an adhesive derived from starch since it has only a minor addition of or treatment with resin adapted to strengthen the basic mixture of starch-derived adhesive and filler as contrasted with the animal variety of glues and synthetic resins heretofore used as adhesives in the making of coated abrasives. In the past when starch derived adhesives have been used in or as binders for coated abrasives, they have been used as diluents for such materials as animal glues and resins and in an amount not to exceed about 50 percent by weight or by volume of the sum of the adhesive constituents and not as the major adhesive constituent of the adhesive compositions.

The great improvement in adhesives that can be brought about by using the correct type of fillers has made possible this change in practice, so that we may use a major fraction of starch-derived adhesives and only a minor fraction of strengthening synthetic resin in preparing binders for coated abrasives as compared with the prior practice of using hide glues and resins for such binders or these materials modified with not to exceed about an equal amount by weight or by volume of starch-derived adhesives.

*Coated abrasive Example II*

By properly diluting the making and sizing adhesives of Example I, as is known in the art, and using a conventional coating of No. 2/0 flint grain and proceeding otherwise as outlined in Coated abrasive Example I, a very satisfactory grade of No. 2/0 flint paper was produced.

*Coated abrasive Example III*

An adhesive suitable for use as a making coat was prepared as follows:

|  | Per cent by Weight | Per cent by Volume |
| --- | --- | --- |
| Gum | 33.93 | 45 |
| Animal Glue | 10.17 | 15 |
| Filler | 55.90 | 40 |

To the solids in the ratio as indicated was added sufficient water to produce an adhesive having a suitable viscosity for coating No. 1/2 flint paper with the adhesive at a temperature of 155° F. in the maker coating box. A suitable viscosity is one measuring about 1400 centipoises at 148° F.

A suitable gum for use in this making coat of adhesive is, for example, a mixed gum consisting of 23 parts by weight of Corn Products Refining Company's "E Gum DK" adhesive and 26 parts by weight of "E Gum DU" adhesive, also sold by Corn Products Refining Company. A suitable glue is 62 millipoise hide glue, a standard product of manufacture by producers of hide glues. A suitable filler is ground calcium carbonate, i. e. marble or limestone, having an average surface diameter of about 14 microns.

A satisfactory sizing composition, all calculated on a solids basis, is the adhesive composition of Coated abrasive Example I. In this case, however, as a further variation, the gum used is a mixture of Corn Products Refining Company's gums given by way of illustration in the preparation of the making coat of adhesive just described for Coated abrasive Example III.

Proceeding as in Coated abrasive Example I, a making coat of adhesive is applied which, when dry, will be equivalent to 1.9 lbs. per sandpaper ream of the dry adhesive composition. The usual coating of No. 1/2 flint grain is applied in the conventional way and the goods are festooned to partially set or dry the maker coat, after which a sizing coat is added in an amount sufficient to give 3.2 lbs. per sandpaper ream of dry solids of the sizing adhesive in the finally dried product. The composite analysis of the adhesive (making and sizing coats) used to anchor the grains is, on a dry basis, as follows:

| | Percent by weight |
|---|---|
| Gum | 34.20 |
| Animal glue | 3.76 |
| Urea-formaldehyde resin | 4.87 |
| Filler | 56.04 |
| Ammonium chloride catalyst | 1.13 |

It will be noted in the above example that about 80 percent of the total adhesive constituents, that is, the total of the gum, glue and resin, is a gum or starch-derived adhesive.

The coated abrasive of Example III has a paper backing and a grit-holding making coat of adhesive consisting of a major fraction of a starch-derived adhesive, a major fraction of an inert, relatively non-absorbent, relatively non-fibrous filler, said filler being in a comminuted state and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns and a minor fraction of hide glue to strengthen the starch-derived adhesive and filler base constituting the greater part of the making adhesive, a coating of abrasive grains and a sizing coat of adhesive applied over the abrasive grains consisting of a major fraction of a starch-derived adhesive such as, for example, a British gum or a dextrin, a major fraction of an inert, relatively non-absorbent, relatively non-fibrous filler, said filler being in a comminuted state and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns, and a minor fraction of a resin adapted to strengthen the starch-derived adhesive.

Coated abrasive Example IV

By appropriately diluting the making and sizing adhesives in Coated abrasive Example III, as is known in the art, and proceeding in the same way as in Example III, but using a conventional grain coating of No. 3/0 flint instead of No. 1/2 flint, a satisfactory No. 3/0 flint paper was produced.

Referring to Coated abrasive Examples III and IV, it is to be noted that the adhesive compositions of these examples are well adapted to prevent any deleterious effect on certain backings caused by the acid nature of the sizing coat. In other words, the making coat protects the paper from any deleterious effect of the acid type sizer when papers are used that are readily or even appreciably damaged by making coats having compositions corresponding to the sizing coats.

Coated abrasive Example V

In this example No. 1/2 flint paper was also made and the procedure was as in Coated abrasive Example III. The making adhesive, however, had the following composition on a dry basis:

| | Per cent by Weight | Per cent by Volume |
|---|---|---|
| Gum | 25.0 | 45 |
| Animal Glue | 7.5 | 15 |
| Filler (Barium Sulphate) | 67.5 | 40 |

Likewise, the composition of the sizing adhesive on a dry basis was as follows:

| | Per cent by Weight | Per cent by Volume |
|---|---|---|
| Gum | 25.0 | 46.0 |
| Urea-Formaldehyde Resin | 5.0 | 9.5 |
| Filler (Barium Sulphate) | 68.7 | 42.5 |
| Ammonium Chloride Catalyst | 1.3 | 2.0 |

The adhesive compositions illustrated in Coated abrasive Example V are well adapted for making such articles as Ream garnet paper and Ream aluminum oxide paper, either open coat or closed coat. It will be noted that these adhesive compositions do not contain free silica and by using them one does not introduce free silica into articles made from an abrasive which does not itself contain free silica, such as Ream garnet paper and Ream fused aluminum oxide paper, given by way of illustration.

While not limited thereto, it is to be understood that adhesive compositions such as described herein and such as have been illustrated in Coated abrasive Examples I to V, inclusive, are particularly well adapted for making the medium grades of coated abrasives as, for example, coated abrasives within the range of about No. 60 to about No. 220.

Coated abrasive Example VI

As previously illustrated, we may use a making coat of glue, starch-derived gum, and appropriate filler which serve both to preliminarily anchor the grains to the backing and protect the backing against any possible injury by an acid type sizing coat. In lieu of glue and starch-derived gum, modified with an appropriate filler, I may use a making coat of glue modified with appropriate filler or a making coat of unmodified hide glue to preliminarily anchor the grains to the backing and protect it from any deleterious effect of the acid nature of subsequently applied sizing coats such as those described herein.

As a further example of our invention, we will outline the manufacture of No. 0–80 "E" weight garnet paper. As a backing, 130 lb. rope cylinder paper, which is now the standard of the industry, was employed. It was coated with a conventional making coat of hide glue, as, for example, a making coat of so-called 86 millipoise hide glue and while the adhesive was in a condition to properly wet the grain, the adhesively coated web was passed by or through a sand-applying means, as, for example, one of the well known electrostatic sand-applying means. After the grains had been so applied in the usual amount, the web was preliminarily festooned so that the making coat of glue partially dried and held the grain rigidly in place. The abrasively coated web so prepared was then passed through a conventional sandpaper sizing machine where a sizing coat of adhesive was applied.

The sizing coat of adhesive was of the following composition:

|  | Percent by Weight | Percent by Volume |
|---|---|---|
| Starch-Derived Gum (For example, Penick & Ford's "Douglas Gum #5408") | 18.20 | 36.5 |
| Urea-Formaldehyde Resin (For example "Urac 180") | 4.83 | 10.3 |
| Barium Sulphate Filler (Of correct particle size as heretofore described) | 75.75 | 50.9 |
| Ammonium Chloride Catalyst | 1.22 | 2.3 |

The sizing adhesive was made up as heretofore described in Example I for making a similar type of adhesive except that in this case sufficient water was used to produce a sizing adhesive with a viscosity of 345 centipoises at 82° F. and the sand sizing adhesive was applied in the conventional coating box while being held at a temperature of 82° F. The sized web was then passed to a conventional sandpaper drying room where it was held in festooned form for about three hours at a temperature in the range of 100° F. to 120° F.

The foregoing sizing adhesive consists of a major fraction of a starch-derived adhesive such as, for example, a British gum or a dextrin, a major fraction of an inert, relatively non-absorbent, relatively non-fibrous filler, said filler being in a comminuted state and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns, and a minor fraction of a resin adapted to strengthen the starch-derived adhesive.

$$\frac{18.20}{18.20+4.83} = \frac{18.20}{23.03}$$

or about 79% by weight of the sizing adhesive constituents consists of adhesive derived from starch.

All modifications coming within the scope of the appended claims and their equivalents are included within the invention.

We claim:

1. A coated abrasive comprising a flexible backing element, a coating of abrasive grains anchored thereon by an abrasive grit-binding adhesive bond, said adhesive bond comprising layers, one of which is a making coat and anchors the abrasive grain coating to the backing, and another of which is superimposed upon and among the grains as a sizing coat, the said adhesive bond comprising starch-derived adhesive material, an inert, relatively non-absorbent, relatively non-fibrous filler, said filler being in a comminuted state and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns, said filler being present in the bond to the extent of about 25 percent to about 55 percent by volume of the dried adhesive bond, and a water soluble amino-aldehyde resin adapted to strengthen the base mixture of amylaceous adhesive and filler, and said starch-derived adhesive being present to the extent of at least about 75% by weight of the sum of the weights of the dried adhesive constituents of the adhesive layer, said starch-derived adhesive having a viscosity at 35% solids and 100° F., after heating to 140–180° F., ranging from 100 cps. to 35,000 cps. and a viscosity at 140° F. ranging from 600 to 20,000 cps. and a viscosity at 12½% solids, measured by the procedure of the National Association of Glue Manufacturers for glue, ranging from 25 to 138 seconds, and a solubility ranging from 25% to 95%, said solubility being defined and determined by dispersing 25 g. of the starch-derived adhesive in 500 cc. of distilled water at 70° F., permitting the undispersed solids to settle overnight, pipetting off 50 cc. of the clear supernatant solution, evaporating the solution to dryness, drying the residue to constant weight at 218° F., dividing the weight thus obtained by the factor 2.5 and multiplying the quotient by 100.

2. A coated abrasive comprising a flexible backing element, a coating of abrasive grains anchored thereon by an abrasive grit-binding adhesive bond, said adhesive bond comprising layers, one of which is a making coat and anchors the abrasive grain coating to the backing, and another of which is superimposed upon and among the grains as a sizing coat, said making coat of adhesive comprising starch-derived adhesive, filler and a water soluble amino-aldehyde coat of adhesive comprising starch-derived adhesive, filler and a water soluble amino-aldehyde resin adapted to strengthen the base mixture of starch-derived adhesive and filler, said filler in each case being an inert, relatively non-absorbent, relatively non-fibrous filler, said filler being in a comminuted state and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns, said filler being present in both the making coat and sizing coat of adhesive to the extent of about 25 percent to about 55 percent by volume of the dried adhesive layer, and said starch-derived adhesive in said making and said sizing coats being present to the extent of at least about 75% by weight of the sum of the weights of the dried adhesive constituents of the adhesive layer, said starch-derived adhesive having a viscosity at 35% solids and 100° F., after heating to 140–180° F., ranging from 100 cps. to 35,000 cps. and a viscosity at 140° F. ranging from 600 to 20,000 cps. and a viscosity at 12½% solids, measured by the procedure of the National Association of Glue Manufacturers for glue, ranging from 25 to 138 seconds, and a solubility ranging from 25% to 95%, said solubility being defined and determined by dispersing 25 g. of the starch-derived adhesive in 500 cc. of distilled water at 70° F., permitting the undispersed solids to settle overnight, pipetting off 50 cc. of the clear supernatant solution, evaporating the solution to dryness, drying the residue to constant weight at 218° F., dividing the weight thus obtained by the factor 2.5 and multiplying the quotient by 100.

3. A coated abrasive comprising a flexible backing element, a coating of abrasive grains anchored thereon by an abrasive grit-binding adhesive bond, said adhesive bond comprising layers, one of which is a making coat and anchors the abrasive grain coating to the backing, and another of which is superimposed upon and among the grains as a sizing coat, said making coat of adhesive consisting of a layer comprising animal glue, and said sizing coat of adhesive comprising starch-derived adhesive, filler and a water soluble amino-aldehyde resin adapted to strengthen the base mixture of amylaceous adhesive and filler, said filler in each case being an inert, relatively non-absorbent, relatively non-fibrous filler, said filler being in a comminuted state and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns, said filler being present in the sizing coat of adhesive to the extent of about 25 percent to about 55 percent by volume of the dried sizing adhesive layer, and said starch-derived adhesive in said sizing coat being present to the extent of at least about 75% by weight of the sum of the weights of the dried adhesive constituents of said sizing coat, said starch-derived adhesive having a viscosity at 35% solids and 100° F., after heating to 140–180° F., ranging from 100 cps. to 35,000 cps. and a viscosity at 140° F. ranging from 600 to 20,000 cps. and a viscosity at 12½% solids, measured by the procedure of the National Association of Glue Manufacturers for glue, ranging from 25 to 138 seconds, and a solubility ranging from 25% to 95%, said solubility being defined and determined by dispersing 25 g. of the starch-derived adhesive in 500 cc. of distilled water at 70° F., permitting the undispersed solids to settle overnight, pipetting off 50 cc. of the clear supernatant solution, evaporating the solution to dryness, drying the residue to constant weight at 218° F., dividing the weight thus obtained by the factor 2.5 and multiplying the quotient by 100.

4. A coated abrasive comprising a flexible backing element, a coating of abrasive grains anchored thereon by an abrasive grit-binding adhesive bond, said adhesive bond comprising layers, one of which is a making coat and anchors the abrasive grain coating to the backing, and another of which is superimposed upon and among the grains as a sizing coat, said making coat consisting of a layer comprising animal glue and filler in an amount effective to harden the making adhesive, and said sizing coat of adhesive comprising starch-derived adhesive, a filler and a water soluble amino-aldehyde resin adapted to strengthen the base mixture of starch-derived adhesive and filler, said filler in each case being an inert, relatively non-absorbent, relatively non-fibrous filler, said filler being in a comminuted state and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns, said filler being present in the sizing coat of adhesive to the extent of about 25 percent to about 55 percent by volume of the dried sizing adhesive layer, and said starch-derived adhesive being present in said sizing coat to the extent of at least about 75% by weight of the sum of the weights of the dried adhesive constituents of said sizing coat, said starch-derived adhesive having a viscosity at 35% solids and 100° F., after heating to 140–180° F., ranging from 100 cps. to 35,000 cps. and a viscosity at 140° F. ranging from 600 to 20,000 cps. and a viscosity at 12½% solids, measured by the procedure of the National Association of Glue Manufacturers for glue, ranging from 25 to 138 seconds, and a solubility ranging from 25% to 95%, said solubility being defined and determined by dispersing 25 g. of the starch-derived adhesive in 500 cc. of distilled water at 70° F., permitting the undispersed solids to settle overnight, pipetting off 50 cc. of the clear supernatant solution, evaporating the solution to dryness, drying the residue to constant weight at 218° F., dividing the weight thus obtained by the factor 2.5 and multiplying the quotient by 100.

5. A coated abrasive comprising a flexible backing element, a coating of abrasive grains anchored thereon by an abrasive grit-binding adhesive bond, said adhesive bond comprising layers, one of which is a making coat and anchors the abrasive grain coating to the backing, and another of which is superimposed upon and among the grains as a sizing coat, said making coat of adhesive consisting of a layer comprising animal glue, and said sizing coat of adhesive comprising starch-derived adhesive, filler and a water soluble urea-formaldehyde resin adapted to strengthen the base mixture of starch-derived adhesive and filler, said filler in each case being an inert, relatively non-absorbent, relatively non-fibrous filler, said filler being in a comminuted state and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns, said filler being present in the sizing coat of adhesive to the extent of about 25 percent to about 55 percent by volume of the dried adhesive layer, and said starch-derived adhesive being present to the extent of at least about 75% by weight of the sum of the weights of the dried adhesive constituents of said sizing coat, said starch-derived adhesive having a viscosity at 35% solids and 100° F., after heating to 140–180° F., ranging from 100 cps. to 35,000 cps. and a viscosity at 140° F. ranging from 600 to 20,000 cps. and a viscosity at 12½% solids, measured by the procedure of the National Association of Glue Manufacturers for glue, ranging from 25 to 138 seconds, and a solubility ranging from 25% to 95%, said solubility being defined and determined by dispersing 25 g. of the starch-derived adhesive in 500 cc. of distilled water at 70° F., permitting the undispersed solids to settle overnight, pipetting off 50 cc. of the clear supernatant solution, evaporating the solution to dryness, drying the residue to constant weight at 218° F., dividing the weight thus obtained by the factor 2.5 and multiplying the quotient by 100.

6. A coated abrasive comprising a flexible backing element, a coating of abrasive grains anchored thereon by an abrasive grit-binding adhesive bond, said adhesive bond comprising layers, one of which is a making coat and anchors the abrasive grain coating to the backing, and another of which is superimposed upon and among the grains as a sizing coat, said making coat of adhesive consisting of a layer comprising animal glue, and said sizing coat of adhesive comprising starch-derived adhesive, a filler and a water soluble aminotriazine aldehyde resin adapted to strengthen the base mixture of starch-derived adhesive and filler, said filler in each case being an inert, relatively non-absorbent, relatively non-fibrous filler, said filler being in a comminuted state and not more than substantially 35 percent by weight of said filler remaining on a 270 mesh screen having a mesh opening of 53 microns and the finer not less than substantially 65 percent by weight of said filler which passes the said screen having an average surface diameter in the range of substantially 5.5 to 40 microns, said filler being present in the sizing coat of adhesive to the extent of about 25 percent to about 55 percent by volume of the dried adhesive layer, and said starch-derived adhesive being present in said sizing coat to the extent of at least about 75% by weight of the sum of the weights of the dried adhesive constituents of said sizing coat, said starch-derived adhesive having a viscosity at 35% solids and 100° F., after heating to 140–180° F., ranging from 100 cps. to 35,000 cps. and a viscosity at 140° F. ranging from 600 to 20,000 cps. and a viscosity at 12½% solids, measured by the procedure of the National Association of Glue Manufacturers for glue, ranging from 25 to 138 seconds, and a solubility ranging from 25% to 95%, said solubility being defined and determined by dispersing 25 g. of the starch-derived adhesive in 500 cc. of distilled water at 70° F., permitting the undispersed solids to settle overnight, pipetting off 50 cc. of the clear supernatant solution, evaporating the solution to dryness, drying the residue to constant weight at 218° F., dividing the weight thus obtained by the factor 2.5 and multiplying the quotient by 100.

7. A coated abrasive according to claim 3 wherein the starch-derived adhesive is dextrin having viscosity and solubility characteristics in the respective ranges set forth in claim 3.

8. A coated abrasive according to claim 3 wherein the starch-derived adhesive is British gum having viscosity and solubility characteristics in the respective ranges set forth in claim 3.

CHARLES S. WEBBER.
WILLIAM F. TIMMER.

REFERENCES CITED

The following references are of record in the file of this patent:

UNITED STATES PATENTS

| Number | Name | Date |
|---|---|---|
| 1,775,631 | Carlton | Sept. 10, 1930 |
| 2,212,314 | Bauer et al. | Aug. 20, 1940 |
| 2,269,415 | Netherly | Jan. 6, 1942 |
| 2,275,314 | Pierson | Mar. 3, 1942 |
| 2,318,121 | Widmer | May 4, 1943 |
| 2,322,156 | Oglesby | June 15, 1943 |
| 2,450,377 | Kesler et al. | Sept. 28, 1948 |

Certificate of Correction

Patent No. 2,534,806

December 19, 1950

CHARLES S. WEBBER ET AL.

It is hereby certified that error appears in the printed specification of the above numbered patent requiring correction as follows:

Column 12, lines 58 to 60, strike out the words and comma "filler and a water soluble amino-aldehyde coat of adhesive comprising starch-derived adhesive," and insert instead *a filler and animal glue and said sizing coat of adhesive comprising starch-derived adhesive*, a; column 13, line 33, before "filler" insert *a*; line 35, strike out "amylaceous" and insert instead *starch-derived*; column 14, line 65, for "open-" read *opening*;

and that the said Letters Patent should be read as corrected above, so that the same may conform to the record of the case in the Patent Office.

Signed and sealed this 29th day of May, A. D. 1951.

[SEAL]

THOMAS F. MURPHY,
*Assistant Commissioner of Patents.*